US012730448B2

(12) United States Patent
Park et al.

(10) Patent No.: US 12,730,448 B2
(45) Date of Patent: Sep. 8, 2026

(54) AUTONOMOUS DRIVING VEHICLE AND A METHOD OF DRIVING THE SAME

(71) Applicants: HYUNDAI MOTOR COMPANY, Seoul (KR); KIA CORPORATION, Seoul (KR)

(72) Inventors: Jong Hyeok Park, Hwaseong-si (KR); Dong Hwan Kwak, Hwaseong-si (KR); Sang Hyeon Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 126 days.

(21) Appl. No.: 18/523,338

(22) Filed: Nov. 29, 2023

(65) Prior Publication Data

US 2024/0402708 A1 Dec. 5, 2024

(30) Foreign Application Priority Data

May 31, 2023 (KR) ........................ 10-2023-0070227

(51) Int. Cl.
*G05D 1/02* (2020.01)
*G05D 1/00* (2006.01)
(Continued)

(52) U.S. Cl.
CPC ....... *G05D 1/0268* (2013.01); *B60W 50/0205* (2013.01); *B60W 2050/0215* (2013.01);
(Continued)

(58) Field of Classification Search
CPC ............ G05D 1/0268; B60W 50/0205; B60W 60/00186; B60W 2050/0215; B60W 2420/403; B60W 2420/408; B60W 2520/06; B60W 2520/10; B60W 2556/40; B60W 50/023; B60W 50/029; B60W 60/0016; G01C 21/1656; G01C 21/30; G01C 21/3848; G01S 7/497; G01S 17/86;
(Continued)

(56) References Cited

U.S. PATENT DOCUMENTS

2019/0072978 A1* 3/2019 Levi ........................ G06N 3/094
2019/0259227 A1* 8/2019 Oesterling ............. G06Q 10/02
(Continued)

*Primary Examiner* — Jelani A Smith
*Assistant Examiner* — Dana D Ivey
(74) *Attorney, Agent, or Firm* — Lempia Summerfield Katz LLC

(57) ABSTRACT

An autonomous driving vehicle includes: a sensor section installed in the autonomous driving vehicle to sense direction data, position data, and velocity data of the autonomous driving vehicle; a camera configured to track movement of the autonomous driving vehicle and to estimate a position; a LiDAR sensor installed in the autonomous driving vehicle to generate LiDAR data; and a processor configured to receive the LiDAR data to generate a map. The processor stores image data for each predetermined driving distance using the camera. The processor also estimates a current position of the autonomous driving vehicle based on the image data stored in a predetermined range, based on a position where an abnormality occurs, and based on current image data captured while being driven in a failure mode in which the abnormality occurs in the LiDAR sensor.

16 Claims, 11 Drawing Sheets

(51) Int. Cl.

| | |
|---|---|
| *B60W 50/02* | (2012.01) |
| *B60W 50/023* | (2012.01) |
| *B60W 50/029* | (2012.01) |
| *B60W 60/00* | (2020.01) |
| *G01C 21/00* | (2006.01) |
| *G01C 21/16* | (2006.01) |
| *G01C 21/30* | (2006.01) |
| *G01S 7/497* | (2006.01) |
| *G01S 17/86* | (2020.01) |
| *G01S 17/89* | (2020.01) |
| *G01S 17/931* | (2020.01) |

(52) U.S. Cl.
CPC ......... *B60W 50/023* (2013.01); *B60W 50/029* (2013.01); *B60W 60/00186* (2020.02); *B60W 2420/403* (2013.01); *B60W 2420/408* (2024.01); *B60W 2520/06* (2013.01); *B60W 2520/10* (2013.01); *B60W 2556/40* (2020.02); *G01C 21/1656* (2020.08); *G01C 21/30* (2013.01); *G01C 21/3848* (2020.08); *G01S 7/497* (2013.01); *G01S 17/86* (2020.01); *G01S 17/89* (2013.01); *G01S 17/931* (2020.01)

(58) Field of Classification Search
CPC ......... G01S 17/89; G01S 17/931; G06T 7/70; B60Y 2306/13
USPC ........................................................... 701/28
See application file for complete search history.

(56) References Cited

U.S. PATENT DOCUMENTS

| | | | | |
|---|---|---|---|---|
| 2019/0332120 | A1* | 10/2019 | Choi | G06F 16/29 |
| 2020/0339151 | A1* | 10/2020 | Batts | B60W 50/029 |
| 2020/0341490 | A1* | 10/2020 | Silva | H04W 4/024 |
| 2021/0215489 | A1* | 7/2021 | Zhang | G01C 21/3602 |
| 2021/0350150 | A1* | 11/2021 | An | G06N 3/0895 |
| 2021/0370968 | A1* | 12/2021 | Xiao | G01C 21/3848 |

* cited by examiner

AUTONOMOUS DRIVING VEHICLE AND A METHOD OF DRIVING THE SAME

This application claims the benefit of and priority to Korean Patent Application No. 10-2023-0070227, filed on May 31, 2023, which is hereby incorporated by reference as if fully set forth herein.

BACKGROUND

Field of the Disclosure

The present disclosure relates to an autonomous driving vehicle and a method of driving the same, and more particularly, to an autonomous driving vehicle capable of accurately recognizing a position of the vehicle using a camera when a light detection and ranging (LiDAR) sensor malfunctions during indoor autonomous driving, and to a method of driving the same.

Discussion of the Related Art

A conventional autonomous driving mobility apparatus or device (referred to herein generally as a 'vehicle') typically cannot receive global positioning system (GPS) signals indoors, and thus safely moves toward a destination by integrating data from installed major sensors.

The conventional autonomous driving vehicle has been unable to perform global localization or positioning when an abnormality, such as physical damage/manufacturing defect/end of operating life, etc., occurs in a light detection and ranging (LiDAR) sensor during autonomous driving indoors. Accordingly, the conventional autonomous driving vehicle has a problem in that precise position estimation is impossible, and thus stability cannot be ensured.

In addition, the conventional autonomous driving vehicle is more complex and requires more data processing when using Visual-Simultaneous Localization and Mapping (SLAM) using a camera for global localization when compared to the case of using LiDAR, resulting in a severe problem in required computing power.

SUMMARY

Accordingly, the present disclosure is directed to an autonomous driving vehicle and a method of driving the same that substantially obviate one or more problems due to limitations and disadvantages of the related art.

An object of the present disclosure is to provide an autonomous driving vehicle capable of controlling global localization or positioning using feature points of a camera image when a light detection and ranging (LiDAR) sensor malfunctions or measurement cannot be performed during autonomous driving. Another object of the present disclosure is to provide a method of driving the vehicle.

Additional advantages, objects, and features of the disclosure are set forth in part in the description which follows and in part should become apparent to those having ordinary skill in the art upon examination of the following or may be learned from practice of the disclosure. The objectives and other advantages of the disclosure may be realized and attained by the structures particularly pointed out in the written description and claims hereof as well as the appended drawings.

To achieve these objects and other advantages and in accordance with the purpose of the disclosure, as embodied and broadly described herein, an autonomous driving vehicle is provided. The autonomous driving vehicle includes at least one sensor installed and configured to sense direction data, position data, and velocity data of the autonomous driving vehicle. The vehicle also includes a camera configured to track movement of the autonomous driving vehicle and to estimate a position thereof. The vehicle also includes a LiDAR sensor installed and configured to generate LiDAR data. The vehicle also includes a processor configured to receive the LiDAR data to generate a map. The processor is configured to store image data for each predetermined driving distance by use of the camera. The processor is also configured to estimate a current position of the autonomous driving vehicle. The estimated current position is determined based on the image data stored in a predetermined range, based on a position where an abnormality occurs in the LiDAR sensor, and based on current image data captured while the vehicle is driven in a failure mode in which the abnormality occurs in the LiDAR sensor.

In at least one embodiment of the present disclosure, the processor is further configured to guide the autonomous driving vehicle to a safe zone based on the estimated current position of the autonomous driving vehicle.

In at least one embodiment of the present disclosure, each of the stored image data and the current image data includes a position (odometry) of the autonomous driving vehicle, a direction (orientation) of the autonomous driving vehicle, and driving data with respect to time.

In at least one embodiment of the present disclosure, the processor is further configured to delete the stored image data based on importance.

In at least one embodiment of the present disclosure, the importance of the stored image data is lower or decreases as a storage time of the image data is older or increases, or a position (odometry) of the autonomous driving vehicle and a direction (orientation) of the autonomous driving vehicle are included in a predetermined range and duplicated.

In at least one embodiment of the present disclosure, the processor is further configured to extract image feature points from the stored image data through an Oriented FAST and Rotated BRIEF (ORB) algorithm.

In at least one embodiment of the present disclosure, when the abnormality occurs in the LiDAR sensor, the processor is further configured to estimate the current position of the autonomous driving vehicle by applying the stored image data and the current image data to a Local Bundle Adjustment (BA) algorithm.

In at least one embodiment of the present disclosure, the predetermined range includes image data stored at a position a shortest distance based on the position where the abnormality occurs.

In another aspect of the present disclosure, a method of driving an autonomous driving vehicle is provided. The vehicle has at least one sensor installed and configured to sense direction data, position data, and velocity data of the autonomous driving vehicle. The vehicle also has a camera configured to track movement of the autonomous driving vehicle and to estimate a position thereof. The vehicle also has a LiDAR sensor installed and configured to generate LiDAR data and a processor configured to receive the LiDAR data to generate a map, under control of the processor. The method includes storing image data for each predetermined driving distance by use of the camera. The method also includes estimating a current position of the autonomous driving vehicle. The estimated current position is determined based on the image data stored in a predetermined range, based on a position where an abnormality occurs in the LiDAR sensor, and based on current image data captured while the vehicle is driven in a failure mode in which the abnormality occurs.

In at least one embodied method of the present disclosure, the method further includes guiding the vehicle to a safe zone based on the estimated current position under control of the processor.

In at least one embodied method of the present disclosure, each of the stored image data and the current image data includes a position (odometry) of the autonomous driving vehicle, a direction (orientation) of the autonomous driving vehicle, and driving data with respect to time.

In at least one embodied method of the present disclosure, the stored image data is deleted based on importance under control of the processor.

In at least one embodied method of the present disclosure, the importance of the stored image data is lower or decreases as a storage time of the image data is older or increases, or a position (odometer) of the autonomous driving vehicle and a direction (orientation) of the autonomous driving vehicle are included in a predetermined range and duplicated.

In at least one embodied method of the present disclosure, the method further includes extracting image feature points from the stored image data through an ORB algorithm under control of the processor.

In at least one embodied method of the present disclosure, when the abnormality occurs in the LiDAR sensor, estimating the current position of the autonomous driving vehicle includes estimating the current position by applying the stored image data and the current image data to a Local BA algorithm under control of the processor.

In at least one embodied method of the present disclosure, the predetermined range includes image data stored at a position of a shortest distance based on the position where the abnormality occurs.

It is to be understood that both the foregoing general description and the following detailed description of the present disclosure are by way of example and explanatory and are intended to provide further explanation of the disclosure as claimed.

BRIEF DESCRIPTION OF THE DRAWINGS

The accompanying drawings are included to provide a further understanding of the disclosure and are incorporated in and constitute a part of this application. The drawings illustrate embodiment(s) of the disclosure and together with the description serve to explain the principle of the disclosure. In the drawings.

DETAILED DESCRIPTION OF THE DISCLOSURE

Hereinafter, embodiments are described to explain the present disclosure in detail and are described in detail with reference to the accompanying drawings to aid in understanding the present disclosure. However, the embodiments according to the present disclosure may be modified in various forms, and the scope of the present disclosure should not be construed as being limited to the embodiments described below. The embodiments of the present disclosure are provided to more completely describe the present disclosure to a person having ordinary skill in the art.

In the description of the present embodiments, when an element is described as being formed "on" (above) or "under" (below) each element, the expressions "on" (above) or "under" (below) inclusively means that two elements are formed in direct contact with each other or that the two elements are (indirectly) formed with one or more other elements disposed therebetween. In addition, the expressions "on" (above) or "under (below) may indicate not only an upward direction but also a downward direction with respect to one element.

When a component, device, unit, element, or the like of the present disclosure is described as having a purpose or performing an operation, function, or the like, the component, device, unit, element, or the like should be considered herein as being "configured to" meet that purpose or to perform that operation or function. Each component, device, unit, element, and the like may separately embody or be included with a processor and a memory, such as a non-transitory computer readable media, as part of the apparatus. As used herein, 'vehicle' may mean any type of manned or unmanned vehicle including cars, trucks, forklifts, dollies, transports, or the like that may travel on roads, in manufacturing plants, in warehouses, etc.

In addition, relational terms such as "first" and "second", "on/upper/above" and "below/lower/under," etc. used below may be used to distinguish one entity or element from another entity or element without necessarily requiring or implying any physical or logical relationship or order between such entities or elements.

Hereinafter, with reference to the accompanying drawings, a description is given of an autonomous driving vehicle. The vehicle is capable of controlling global localization or positioning using image feature points of a camera 40 when a light detection and ranging (LiDAR) sensor 30 malfunctions or when measurement cannot be performed during autonomous driving indoors according to an embodiment. A description is also given of a method of driving such an autonomous driving vehicle.

Figure 1:
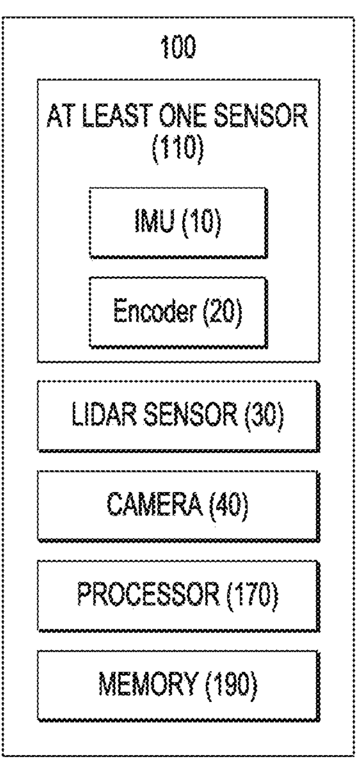
FIG. 1 is a block diagram for describing an autonomous driving vehicle according to an embodiment of the present disclosure.

FIG. 1 is a block diagram for describing the autonomous driving vehicle according to an embodiment of the present disclosure.

Referring to FIG. 1, an autonomous driving vehicle 100 according to an embodiment of the present disclosure may include at least one sensor 110, a camera 40, a LiDAR sensor 30, a processor 170, and a memory 190.

The at least one sensor 110 is mounted on the autonomous driving vehicle 100 and may include at least one sensor. For example, the at least one sensor 110 may include an inertial measurement unit (IMU) 10 and an encoder 20.

The IMU 10 is an inertial measurement device. The IMU 10 includes an acceleration sensor and an angular velocity sensor (gyroscope) and may include a terrestrial magnetism sensor (magnetometer) in some cases.

The IMU 10 may generate direction data. For example, the direction data may be information on a course direction of the autonomous driving vehicle 100. The direction data may include orientation data.

The encoder 20 may perform a control operation by receiving feedback of a position of the autonomous driving vehicle 100. The encoder 20 may generate position data and velocity data. For example, the position data and the velocity data may be information of at least one of a position or a velocity of the autonomous driving vehicle 100 in rotary motion or translation motion.

The autonomous driving vehicle 100 may fuse at least one piece of data acquired through the IMU 10 and the encoder 20 under the control of the processor 170, thereby calculating or estimating local localization or positioning, which is a position relative to the autonomous driving vehicle 100.

At least one camera 40 may be installed in the autonomous driving vehicle 100. The camera 40 may photograph obstacles and obstacle conditions around the autonomous driving vehicle 100 and output images and image data based on photographed information.

The camera 40 may track movement of the autonomous driving vehicle 100 and estimate a position under the control of the processor 170. The camera 40 may extract image feature points based on an image or image data under the control of the processor 170.

At least one LiDAR sensor 30 may be installed in the autonomous driving vehicle 100. After irradiating a laser pulse to an object, the LiDAR sensor 30 may measure a return time of the laser pulse reflected from the object within a measurement range, may sense information such as a distance to the object, a direction of the object, and a velocity, and may output LiDAR data based on the sensed information. Here, the object may be any obstacle existing outside the autonomous driving vehicle 100. For example, obstacles may be buildings, people, or nearby objects.

The processor 170 may acquire LiDAR data or scan data through the LiDAR sensor 30. Here, the LiDAR data may include a plurality of distance values corresponding to a plurality of azimuth angles, respectively.

The processor 170 stores image data for each predetermined driving distance using the camera 40. In the case of a failure mode in which an error occurs in the LiDAR sensor 30, the processor 170 may estimate a current position of the autonomous driving vehicle 100. The position may be estimated based on image data stored in a predetermined range, based on a position of the vehicle 100 where an abnormality or error in the LiDAR occurred, and current image data captured while driving to the stored image data.

Here, each of the stored image data and the current image data may include data on the position (via visual odometry) of the autonomous driving vehicle 100, the direction (orientation) of the autonomous driving vehicle 100, and time.

The processor 170 may control the overall operation of the autonomous driving vehicle 100 by being provided with a plurality of pieces of driving-related information received through a communication module (not shown) according to a pre-stored program. For example, the processor 170 may be provided with a plurality of pieces of driving-related information, which is received through an external server or the memory 190 of the driving vehicle 100, through the communication module (not shown).

Further, the processor 170 may generate a random indoor map using LiDAR data or scan data provided from the LiDAR sensor 30. The generated map may be stored in the memory 190 under the control of the processor 170.

The processor 170 may also be referred to by terms such as "control unit," "microprocessor," "controller," "microcontroller," and/or the like.

The memory 190 may store a program for driving the autonomous driving vehicle 100, data generated during an operation of the processor 170, and other data.

The processor 170 may estimate or extract local localization or positioning, which is a relative position of the autonomous driving vehicle 100, using at least one of direction data, position data, or velocity data provided from the encoder 20 and the IMU 10.

Here, the processor 170 may control determination of misrecognition of the position of the autonomous driving vehicle 100, position adjustment, posture correction, etc. based on the local localization.

The processor 170 may estimate or extract global localization or positioning by applying LiDAR data or scan data provided from the LiDAR sensor 30 to the local localization. Here, the local localization may be a position relative to the current position of the autonomous driving vehicle 100, and the global localization may be an absolute position relative to the current position of the autonomous driving vehicle 100. In other words, the processor 170 may estimate or calculate an absolute position for the current position of the autonomous driving vehicle 100 by applying LiDAR data or scan data to a relative position, which is local localization.

The processor 170 may ensure safety of indoor autonomous driving by estimating or extracting a precise position based on global localization.

The processor 170 may more accurately determine the current position of the autonomous driving vehicle 100 on a corresponding map or virtual map based on global localization.

When the current position of the autonomous driving vehicle 100 is estimated, the processor 170 may induce the autonomous driving vehicle 100 to a safe zone based on the estimated current position.

The processor 170 may delete stored image data based on a predetermined level of importance. At this time, the stored image data may become less important, i.e. may be determined to be of a lower or decreased level as a storage time-point of the image data becomes older or longer. The position (odometry) of the autonomous driving vehicle and the direction (orientation) of the autonomous driving vehicle are included within a predetermined range and duplicated, i.e., as data on the position (odometry) of the autonomous driving vehicle and the direction (orientation) of the autonomous driving vehicle stored in the stored image data is duplicated. A detailed description thereof is provided below.

The processor 170 may extract image feature points from stored image data through an Oriented FAST and Rotated BRIEF (ORB) algorithm. Since content related to the ORB algorithm is conventional art, a detailed description thereof has been omitted.

When an abnormality occurs in the LiDAR sensor 30, the processor 170 may estimate the current position of the autonomous driving vehicle by applying the stored image data and the current image data to a Local Bundle Adjustment (BA) algorithm. Details of the Local BA algorithm are also described below.

Under the control of the processor 170, when an abnormality occurs in the LiDAR sensor 30, the autonomous driving vehicle 100 may apply the stored image data and current image data to the Local BA algorithm to estimate the current position of the autonomous driving vehicle. The processor 170 may also perform a control operation so that the autonomous driving vehicle 100 moves to a safe zone based on the estimated current position, thereby improving safety. A detailed description thereof is also provided below.

Figure 2:
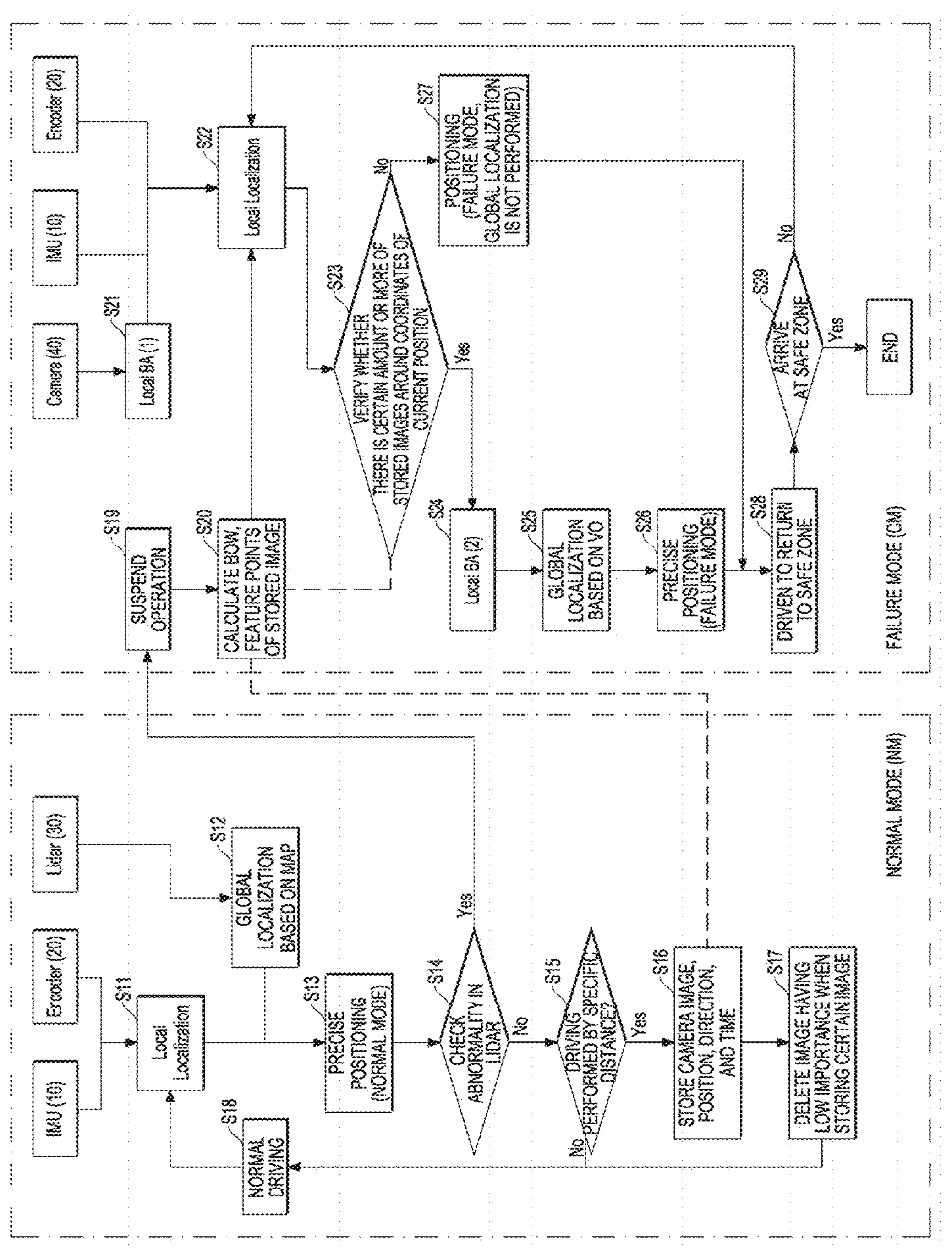
FIG. 2 is a flowchart for describing a method of driving an autonomous driving vehicle according to an embodiment of the present disclosure.

FIG. 2 is a flowchart for describing a method of driving the autonomous driving vehicle according to an embodiment of the present disclosure. FIGS. 3-9B are diagrams for describing the flowchart of FIG. 2 in more detail.

Referring to FIGS. 2-9B, the autonomous driving vehicle 100 according to an embodiment of the present disclosure may perform positioning using the camera 40 capable of avoiding and recognizing obstacles during indoor autonomous driving in a normal mode or a failure mode.

[In Normal Mode]

Under the control of the processor 170, the autonomous driving vehicle 100 may estimate or extract local localization by fusing at least one of direction data, position data, or velocity data provided from the encoder 20 and the IMU 10 (S11).

In addition, under the control of the processor 170, the autonomous driving vehicle 100 may estimate or extract map-based global localization using LiDAR data provided from the LIDAR sensor 30 (S12).

The autonomous driving vehicle 100 may perform precise positioning based on the estimated local localization and the estimated global localization under the control of the processor 170 (S13).

Figure 3:
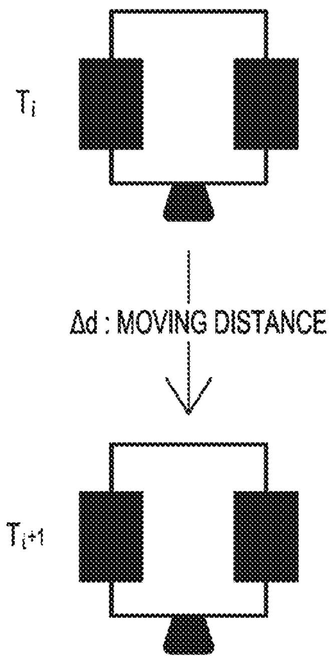
FIGS. 3-9B are diagrams for describing the flowchart of FIG. 2 in detail.
Figure 4:
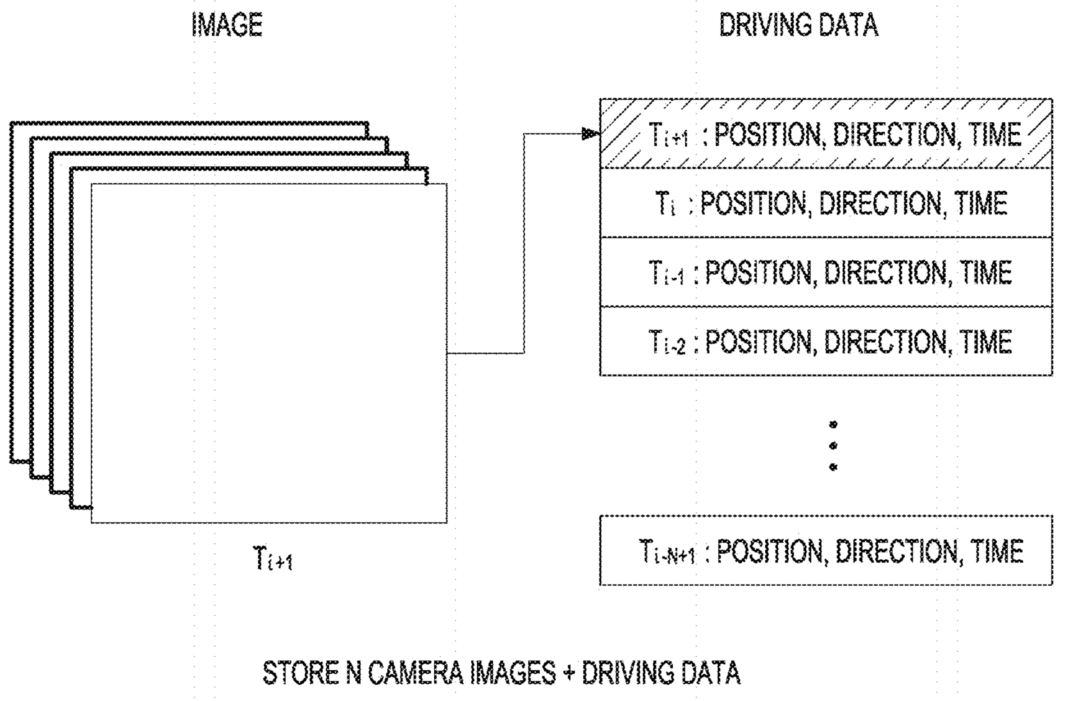

As illustrated in FIGS. 3 and 4, under the control of the processor 170, upon determining that the LiDAR sensor 30 has no abnormality (S14), the autonomous driving vehicle 100 may store image data (S16) each time driving is performed by a predetermined driving distance $\Delta d$ or a specific distance using the camera 40 (S15). The predetermined driving distance $\Delta d$ may be a driving distance in which driving is performed from $T_i$ to $T_{i+1}$.

At this time, the image data may include the image of the camera, the position (odometry) of the autonomous driving vehicle 100, the direction (orientation) of the autonomous driving vehicle (100), driving data with respect to time (($T_{i+1}$: position, direction, time), ($T_i$: position, direction, time), ($T_{i-1}$: position, direction, time), ($T_{i-2}$: position, direction, time), . . . , ($T_{i-N+1}$: position, direction, time)), etc. In this instance, the image data may be stored in the memory 190 as raw data without additional processing under the control of the processor 170.

Figure 5:
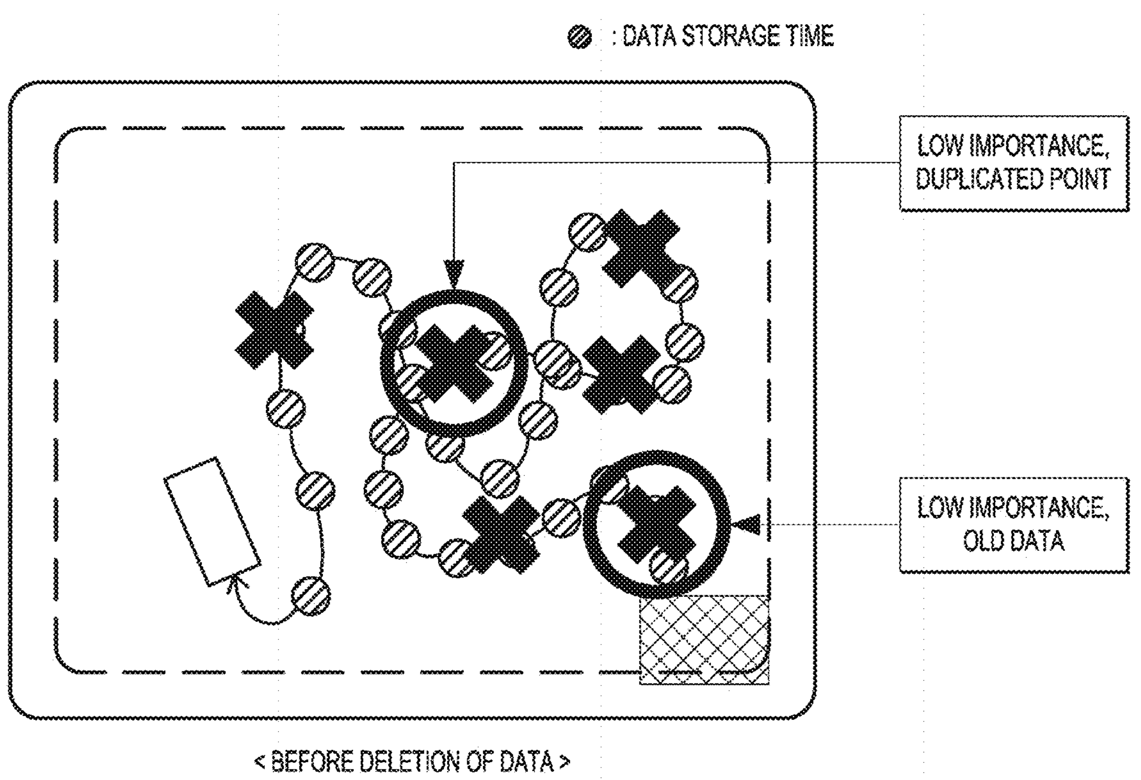
Figure 6:
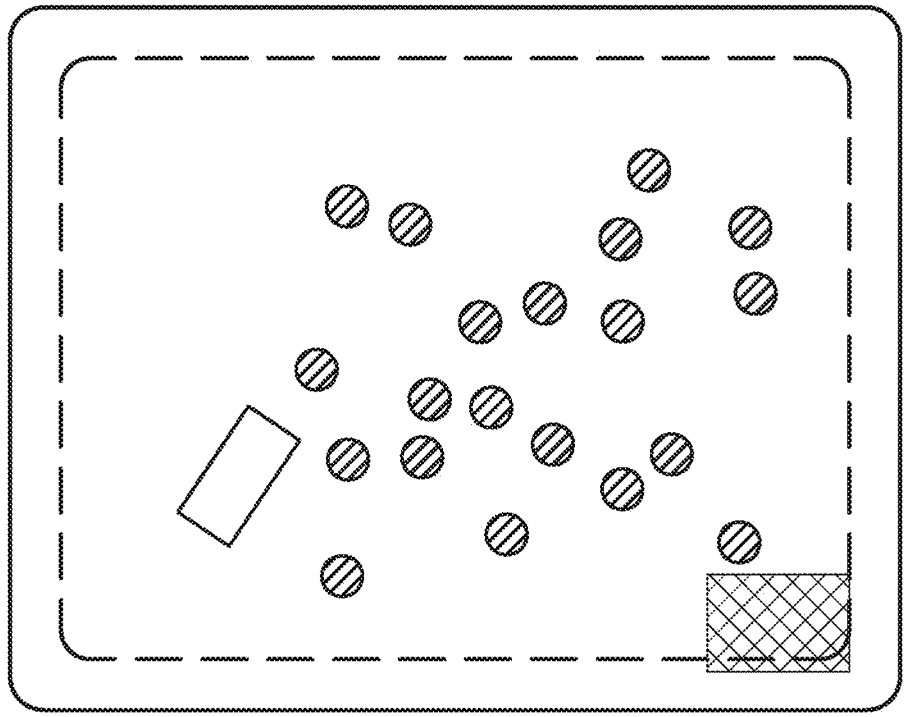

Thereafter, as shown in FIGS. 5 and 6, the autonomous driving vehicle 100 may sequentially delete stored image data in order of low importance at regular intervals under the control of the processor 170, when a predetermined image storage range is exceeded (S17).

At this time, the importance may be determined to be lower or decreased as the storage time of the image data is older or increased or data on the position (odometry) of the autonomous driving vehicle and the direction (orientation) of the autonomous driving vehicle is duplicated.

Thereafter, the autonomous driving vehicle 100 may normally perform autonomous driving indoors under the control of the processor 170 (S18).

[In Failure Mode]

Under the control of the processor upon determining that the LiDAR sensor 30 has an abnormality (S14), the autonomous driving vehicle 100 suspends operation at the position where the abnormality occurred (S19), and then extracts image feature points from stored image data or calculates BoW (bag-of-words) (S20).

At this time, the processor may extract the image feature points from the stored image data through an ORB algorithm. Since the ORB algorithm is conventional technology, a detailed description thereof has been omitted.

Here, it has been described that the autonomous driving vehicle 100 suspends operating at the position where the abnormality occurs under the control of the processor 170 upon determining that the LiDAR sensor 30 has the abnormality (S14). However, the present disclosure is not limited thereto. In some cases, the feature points may be extracted from the stored image data or BoW may be calculated while slowly operating without suspension.

Figure 7:
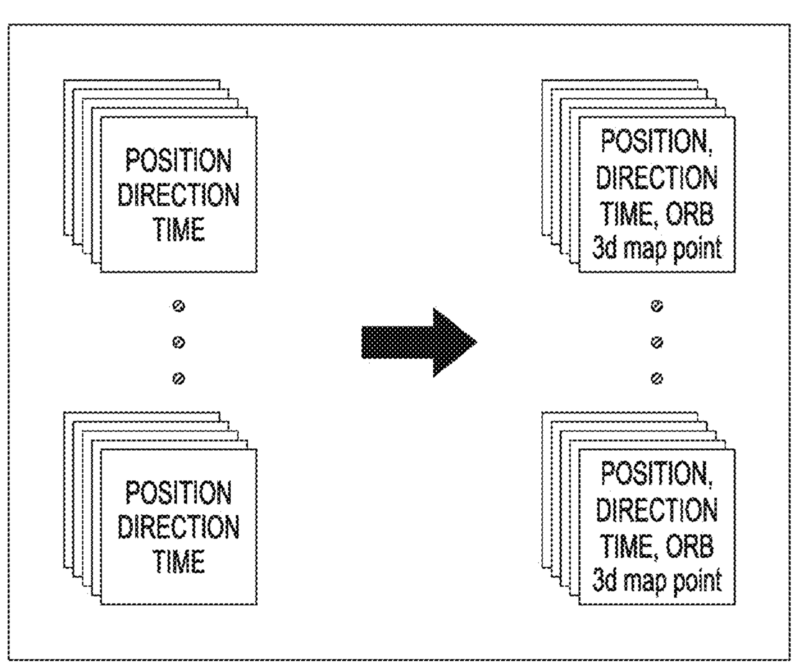

As shown in FIG. 7, under the control of the processor 170, the autonomous driving vehicle 100 may estimate or extract local localization by fusing the image feature points (S21) extracted from the image data stored through the camera 40 before an abnormality occurs in the LiDAR sensor 30 and at least one of direction data, position data, or velocity data provided from the encoder 20 and the IMU 10 (S22).

Here, the processor 170 may apply the stored image data to a Local BA(1) (Bundle Adjustment (1)) algorithm to calculate the image feature points (S21). A detailed description thereof is provided below.

Then, under the control of the processor 170, the autonomous driving vehicle 100 may determine whether there is more than a certain amount of stored image data within a certain range based on coordinates of a current position where the abnormality occurs in the LiDAR sensor 30 (S23).

Figure 8:
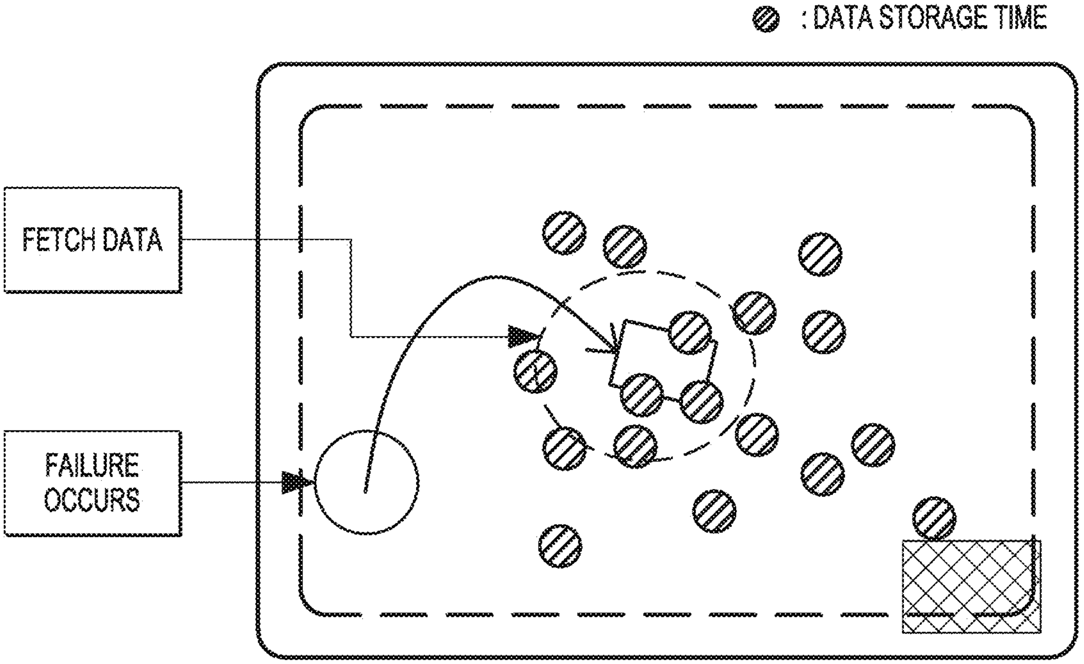

As shown in FIG. 8, under the control of the processor 170, upon determining that there is image data stored within a predetermined range based on the coordinates of the current position where the abnormality occurs in the LiDAR sensor 30 (S23), the autonomous driving vehicle 100 may estimate or extract local localization, which is a relative position of the autonomous driving vehicle, based on the image data stored in the predetermined range and current image data captured while driving to the stored image data (S24).

In this instance, the predetermined range may be image data stored at a position a shortest distance from the position where the abnormality occurs.

Here, the processor 170 may apply a Local BA(2) (Bundle Adjustment (2)) algorithm to each of the stored image data and the captured current image data to calculate image feature points from each of the data (S24). A detailed description thereof is provided below.

Under the control of the processor 170, the autonomous driving vehicle 100 may estimate global localization, which is an absolute position, based on image feature points calculated from each of the stored image data and the captured current image data through the Local BA(2) algorithm (S25).

The autonomous driving vehicle 100 may estimate global localization, which is an absolute position, through a visual odometer (VO), which is a speedometer, under the control of the processor 170 (S25).

For example, the processor 170 may control the VO, which is the speedometer, to extract image feature points, match image feature points on several pieces of stored image data, and then estimate a position (pose) of the camera and 3D map points of the image feature points based on intrinsic parameters of the camera.

In this way, surrounding 3D environment information of the autonomous driving vehicle 100 and a moving trajectory of the camera may be obtained.

Thereafter, the autonomous driving vehicle 100 may perform precise positioning based on global localization, which is an estimated absolute position, under the control of the processor 170 (S26).

Figure 9A:
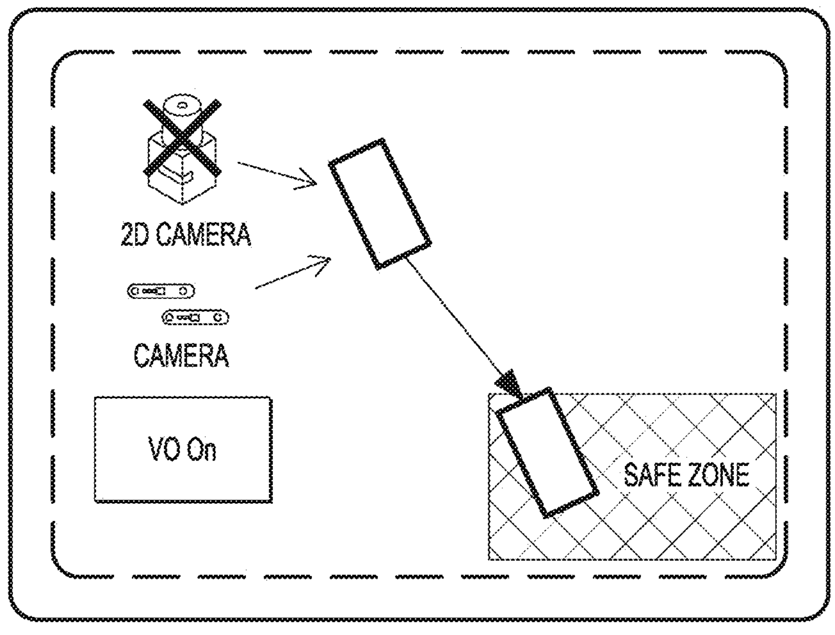
Figure 9B:
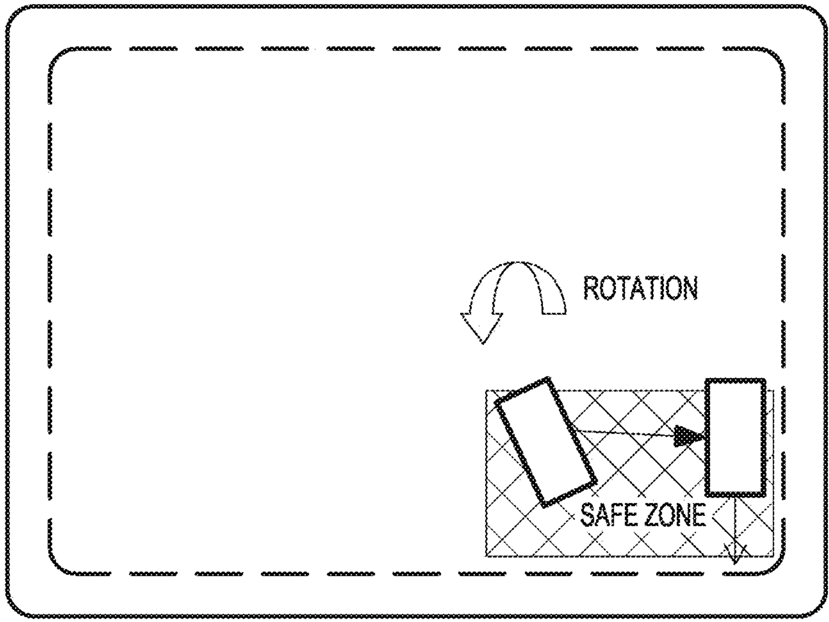

As shown in FIGS. 9A and 9B, the autonomous driving vehicle 100 may be driven to return to a safe zone based on precise positioning under the control of the processor 170 (S28).

In other words, under the control of the processor 170, the autonomous driving vehicle 100 may be driven into a "safe zone" area designated in advance using a global localization function based on the VO, which is the speedometer (S29).

Under the control of the processor 170, when the autonomous driving vehicle 100 arrives at the safe zone (S29), the autonomous driving vehicle 100 may recognize a pre-installed parking QR mark or code using the camera 40 while rotating in place and may detect image feature points to correct a final position (pose) of the autonomous driving vehicle 100.

Finally, under the control of the processor 170, the autonomous driving vehicle 100 may complete parking according to the QR mark to end driving.

In addition, under the control of the processor 170, upon determining that there is no image data stored within a predetermined range based on the coordinates of the current position where the abnormality occurs in the LiDAR sensor 30 (S23), the autonomous driving vehicle 100 may perform positioning without estimating global localization, which is an absolute position (S27).

Thereafter, the autonomous driving vehicle 100 may be driven to return to a safe zone based on positioning under the control of the processor 170 (S28).

Figure 10:
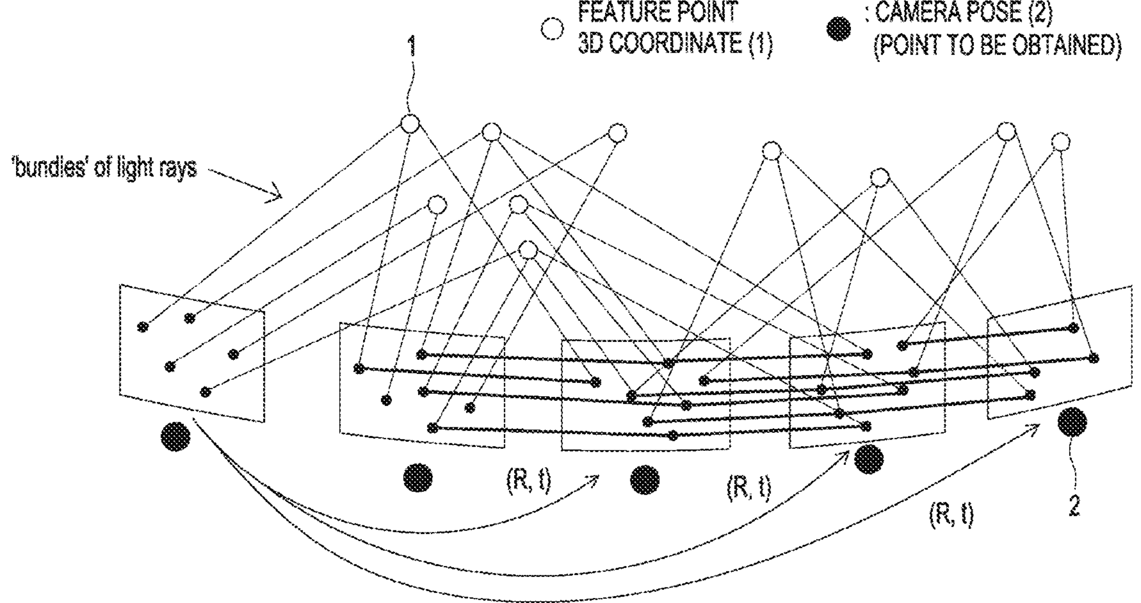
FIG. 10 is a diagram for describing a Local Bundle Adjustment (BA) (1) algorithm according to an embodiment of the present disclosure.

FIG. 10 is a diagram for describing the Local BA(1) algorithm according to an embodiment of the present disclosure.

Referring to FIG. 10, the Local BA(1) algorithm may calculate image feature points for each of n images (or image data) recently stored under the control of the processor 170.

At this time, a target value to be calculated is feature point 3D coordinates (1) and a camera position (pose, 2), which may be calculated in the same way as the VO, a general speedometer.

Figure 11:
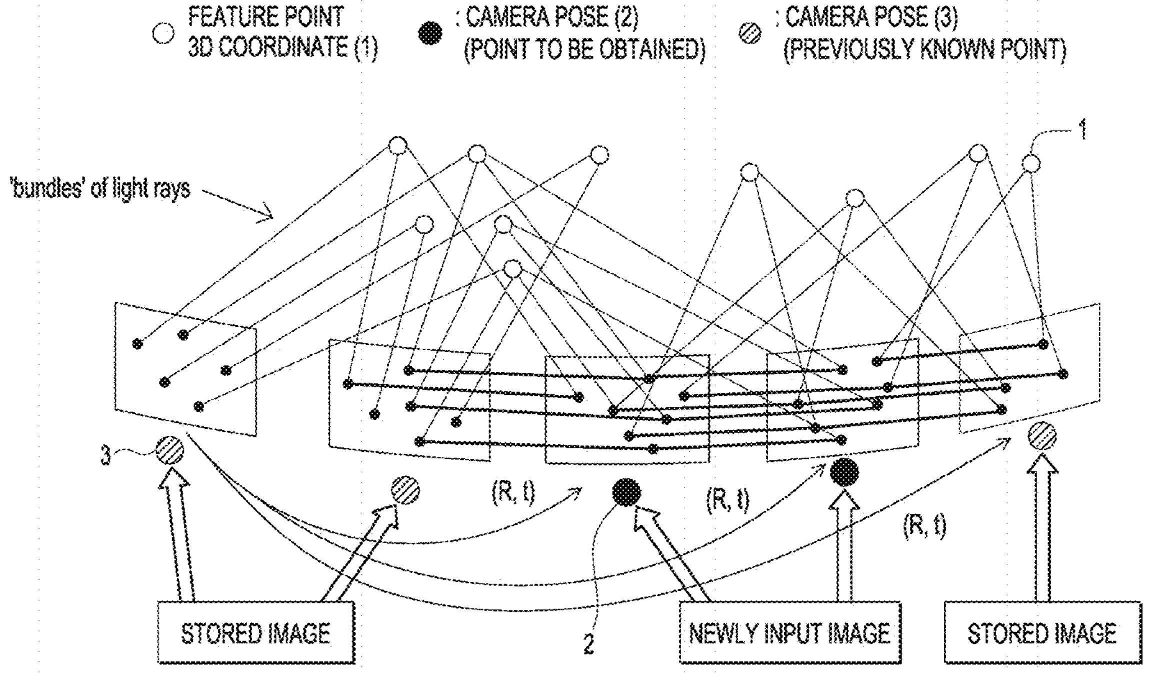
FIG. 11 is a diagram for describing a Local BA(2) algorithm according to an embodiment of the present disclosure.

FIG. 11 is a diagram for describing the Local BA(2) algorithm according to an embodiment of the present disclosure.

Referring to FIG. 11, unlike the Local BA (1) algorithm, the Local BA (2) algorithm may calculate feature point 3D coordinates (1) using both a stored image and an image newly received through a camera under the control of the processor 170.

At this time, the stored image may have significantly accurate position and direction information obtained through global localization of the encoder 20, the IMU 10, and the LiDAR sensor 30 as described above.

Therefore, the feature point 3D coordinates (1) generated using this are relatively accurate, and the camera position (pose, 2) to be calculated or the camera position (pose, 3) that is previously known may be accurately calculated.

Meanwhile, a recording medium for storing a program for executing a method of driving the autonomous driving vehicle 100 may store a program implementing functions. A computer may read the recording medium.

A computer-readable recording medium includes all types of storage devices in which data readable by a computer system is stored. Examples of the computer-readable recording medium include a read-only memory (ROM), a random-access memory (RAM), a CD-ROM, a magnetic tape, a floppy disk, and an optical data storage device. In addition, the computer-readable recording medium may be distributed to computer systems connected through a network, so that computer-readable code may be stored and executed in a distributed manner. In addition, functional programs, code, and code segments for implementing the method of driving the autonomous driving vehicle 100 may be inferred by programmers in the technical field to which the present disclosure pertains.

Various embodiments described above may be combined with each other, as long as the embodiments do not contradict each other, without departing from the purpose of the present disclosure. In addition, among the various embodiments described above, when components of one embodiment are not described in detail, descriptions of components having the same reference numerals in other embodiments may be applied thereto.

The autonomous driving vehicle and the method of driving the same according to the embodiments may improve stability of indoor driving by controlling global localization using feature points of a camera image when the LiDAR sensor malfunctions or when measurement cannot be performed during autonomous driving indoors.

In addition, the autonomous driving vehicle and the method of driving the same according to the embodiments may improve safety during driving without a significant increase in the amount of computation and additional cost of a sensor or a management system by controlling global localization using feature points of a camera image when the LiDAR sensor 30 malfunctions or when measurement cannot be performed during autonomous driving indoors.

Even though embodiments have been described above, these embodiments are merely examples and do not limit the present disclosure. Those of ordinary skill in the field to which the present disclosure pertains should understand that various modifications and applications not illustrated above are possible within the scope of the disclosure while not departing from the essential characteristics of the present disclosure. For example, each element specifically shown in the embodiments may be modified and implemented. Further, differences related to these modifications and applications should be construed as being included in the scope of the present disclosure defined in the appended claims.

What is claimed is:

1. An autonomous driving vehicle comprising:

at least one sensor installed in the autonomous driving vehicle to sense direction data, position data, and velocity data of the autonomous driving vehicle;

a camera configured to track movement of the autonomous driving vehicle and to estimate a position thereof;

a light detection and ranging (LiDAR) sensor installed in the autonomous driving vehicle to generate LiDAR data; and a processor configured to receive the LiDAR data to generate a map, wherein the processor is configured to store image data for each predetermined driving distance by use of the camera, estimate a current position of the autonomous driving vehicle based on the image data stored in a predetermined range, based on a position where an abnormality occurs in the LiDAR sensor, and based on current image data captured while the autonomous driving vehicle is driven in a failure mode in which the abnormality occurs in the LiDAR sensor, guide the autonomous driving vehicle to a safe zone when the current position of the autonomous driving vehicle is estimated, and delete the stored image data based on importance of the stored image data, wherein the importance of the stored image data decreases as a position of the autonomous driving vehicle and a direction of the autonomous driving vehicle are included in a predetermined range and duplicated, and wherein, when estimating the current position of the autonomous driving vehicle, the processor is further configured to extract image feature points from each of the stored image data and the captured current image data, based on there being more than a certain amount of the stored image data within the predetermined range based on coordinates of the position, estimate global location based on the extracted image feature points, and perform precise positioning based on the global location.

2. The autonomous driving vehicle according to claim 1, wherein each of the stored image data and the current image data includes a position (odometry) of the autonomous driving vehicle, a direction (orientation) of the autonomous driving vehicle, and driving data with respect to time.

3. The autonomous driving vehicle according to claim 1, wherein the importance of the stored image data decreases as a storage time of the image data increases.

4. The autonomous driving vehicle according to claim 1, wherein the processor is configured to extract the image feature points through an Oriented FAST and Rotated BRIEF (ORB) algorithm.

5. The autonomous driving vehicle according to claim 4, wherein, when the abnormality occurs in the LiDAR sensor, the processor is further configured to estimate the current position of the autonomous driving vehicle by applying the stored image data and the current image data to a Local Bundle Adjustment (BA) algorithm.

6. The autonomous driving vehicle according to claim 1, wherein the predetermined range includes image data stored at a position of a shortest distance based on the position where the abnormality occurs.

7. The autonomous driving vehicle according to claim 1, wherein the processor is further configured to:

obtain surrounding 3D environment information of the autonomous driving vehicle and a moving trajectory of the camera by matching the image feature points on several pieces of the stored image data and by estimating a position of the camera and 3D map points of the image feature points based on intrinsic parameters of the camera.

8. The autonomous driving vehicle according to claim 1, wherein, when guiding the autonomous driving vehicle to the safe zone, the processor is further configured to:

recognize a pre-installed parking QR mark or code using the camera while rotating in place; and detect the image feature points to correct a final position of the autonomous driving vehicle.

9. A method of driving an autonomous driving vehicle including at least one sensor configured to sense direction data, position data, and velocity data of the autonomous driving vehicle, a camera configured to track movement of the autonomous driving vehicle and to estimate a position thereof, a light detection and ranging (LiDAR) sensor to generate LiDAR data, and a processor configured to receive the LiDAR data to generate a map, under control of the processor, the method comprising:

storing image data for each predetermined driving distance by use of the camera;

estimating a current position of the autonomous driving vehicle based on the image data stored in a predetermined range, based on a position where an abnormality occurs in the LiDAR sensor, and based on current image data captured while the autonomous driving vehicle is driven in a failure mode in which the abnormality occurs;

guiding the autonomous driving vehicle to a safe zone when the current position of the autonomous driving vehicle is estimated; and deleting the stored image data based on importance of the stored image data, wherein the importance of the stored image data decreases as a position of the autonomous driving vehicle and a direction of the autonomous driving vehicle are included in a predetermined range and duplicated, and wherein estimating the current position of the autonomous driving vehicle includes extracting image feature points from each of the stored image data and the captured current image data, based on there being more than a certain amount of the stored image data within the predetermined range based on coordinates of the position, estimating global location based on the extracted image feature points, and performing precise positioning based on the global location.

10. The method according to claim 9, wherein each of the stored image data and the current image data includes a position of the autonomous driving vehicle, a direction of the autonomous driving vehicle, and driving data with respect to time.

11. The method according to claim 9, wherein the importance of the stored image data decreases as a storage time of the image data increases.

12. The method according to claim 9, wherein the image feature points are extracted through an Oriented FAST and Rotated BRIEF (ORB) algorithm under control of the processor.

13. The method according to claim 12, wherein, when the abnormality occurs in the LiDAR sensor, estimating the current position of the autonomous driving vehicle comprises estimating the current position by applying the stored image data and the current image data to a Local Bundle Adjustment (BA) algorithm under control of the processor.

14. The method according to claim 9, wherein the predetermined range includes image data stored at a position of a shortest distance based on the position where the abnormality occurs.

15. The method according to claim 9, wherein estimating the current position of the autonomous driving vehicle further comprises:

obtaining surrounding 3D environment information of the autonomous driving vehicle and a moving trajectory of the camera by matching the image feature points on several pieces of the stored image data and by estimating a position of the camera and 3D map points of the image feature points based on intrinsic parameters of the camera.

16. The method according to claim 9, wherein guiding the autonomous driving vehicle to the safe zone further comprises:

recognizing a pre-installed parking QR mark or code using the camera while rotating in place; and detecting the image feature points to correct a final position of the autonomous driving vehicle.

* * * * *